United States Patent
Saito

(10) Patent No.: US 12,469,264 B2
(45) Date of Patent: Nov. 11, 2025

(54) INFORMATION PROCESSING APPARATUS, IMAGE CAPTURING APPARATUS, METHOD, AND NON-TRANSITORY COMPUTER READABLE STORAGE MEDIUM

(71) Applicant: CANON KABUSHIKI KAISHA, Tokyo (JP)

(72) Inventor: Kosuke Saito, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 469 days.

(21) Appl. No.: 18/155,798

(22) Filed: Jan. 18, 2023

(65) Prior Publication Data
US 2023/0245432 A1    Aug. 3, 2023

(30) Foreign Application Priority Data

Jan. 28, 2022 (JP) .................. 2022-012026

(51) Int. Cl.
| G06V 10/776 | (2022.01) |
| G06N 5/046 | (2023.01) |
| G06V 10/764 | (2022.01) |
| G06V 10/774 | (2022.01) |
| G06V 10/82 | (2022.01) |

(52) U.S. Cl.
CPC .......... *G06V 10/776* (2022.01); *G06N 5/046* (2013.01); *G06V 10/764* (2022.01); *G06V 10/774* (2022.01); *G06V 10/82* (2022.01)

(58) Field of Classification Search
CPC .. G06V 10/776; G06V 10/764; G06V 10/774; G06V 10/82; G06V 20/52; G06V 40/103; G06N 5/046; G06N 3/08; G06N 3/048
USPC .......................................... 382/157
See application file for complete search history.

(56) References Cited

U.S. PATENT DOCUMENTS 11,615,300 B1 *   3/2023   Faraone ................. G06N 3/084
                                                             706/19

FOREIGN PATENT DOCUMENTS

JP       2020-160564 A      10/2020
WO    WO-2020196586 A1 * 10/2020 ............. G06N 3/063

* cited by examiner

*Primary Examiner* — Charlotte M Baker
(74) *Attorney, Agent, or Firm* — Carter, DeLuca & Farrell LLP

(57) ABSTRACT

A shifting unit shifts an output of an activation function corresponding to an input, based on an output range of the activation function. A scaling unit scales the output of the activation function, the output of the activation function having been shifted by the shifting unit. An output unit outputs an output value corresponding to the output of the activation function, the output of the activation function having been scaled by the scaling unit. The activation function is a function in which the minimum value of the output of the activation function corresponding to the input is equal to or larger than a predetermined value.

12 Claims, 9 Drawing Sheets

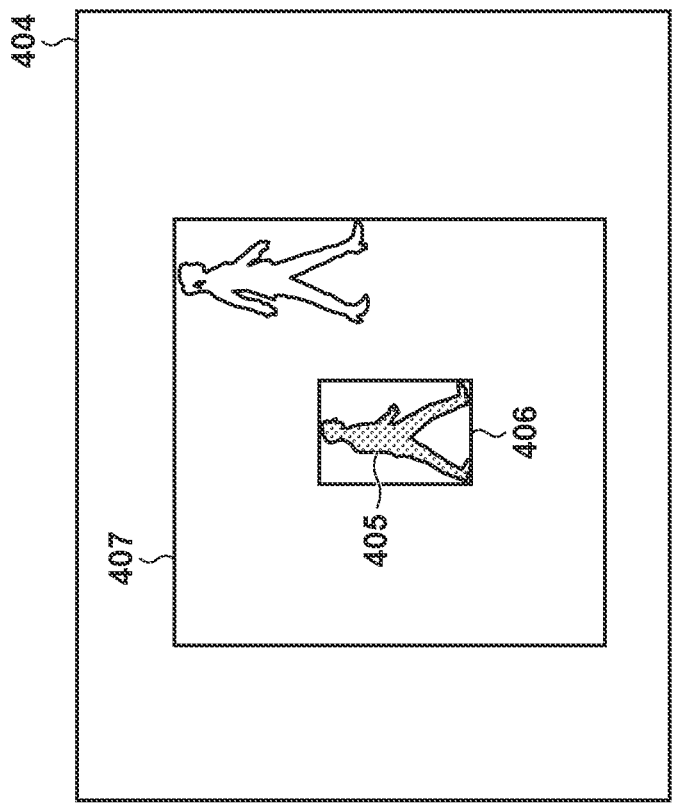
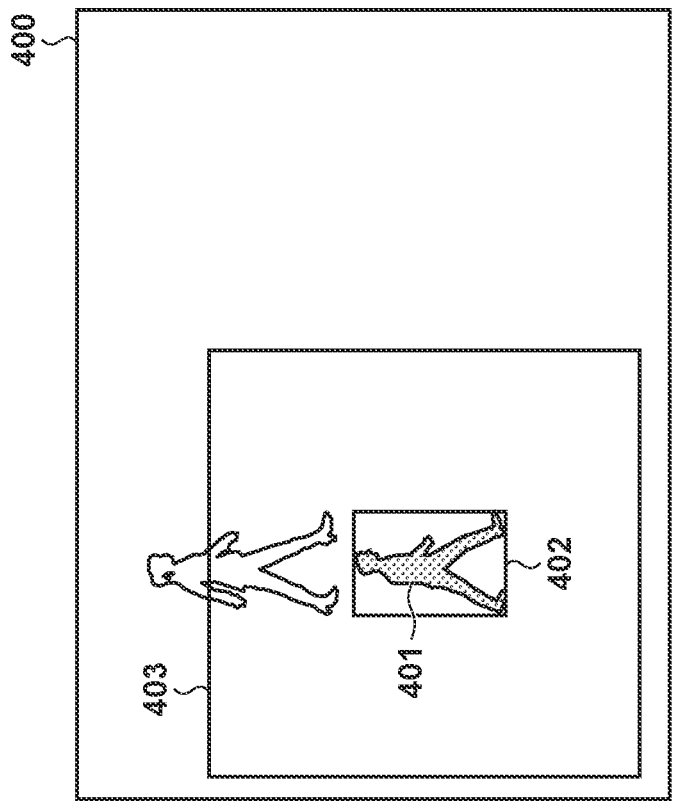

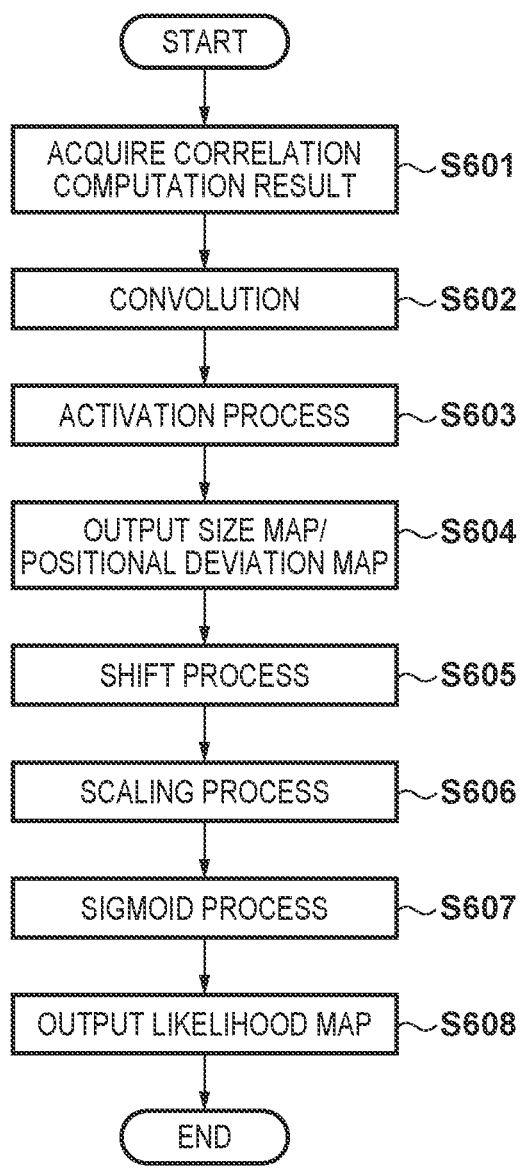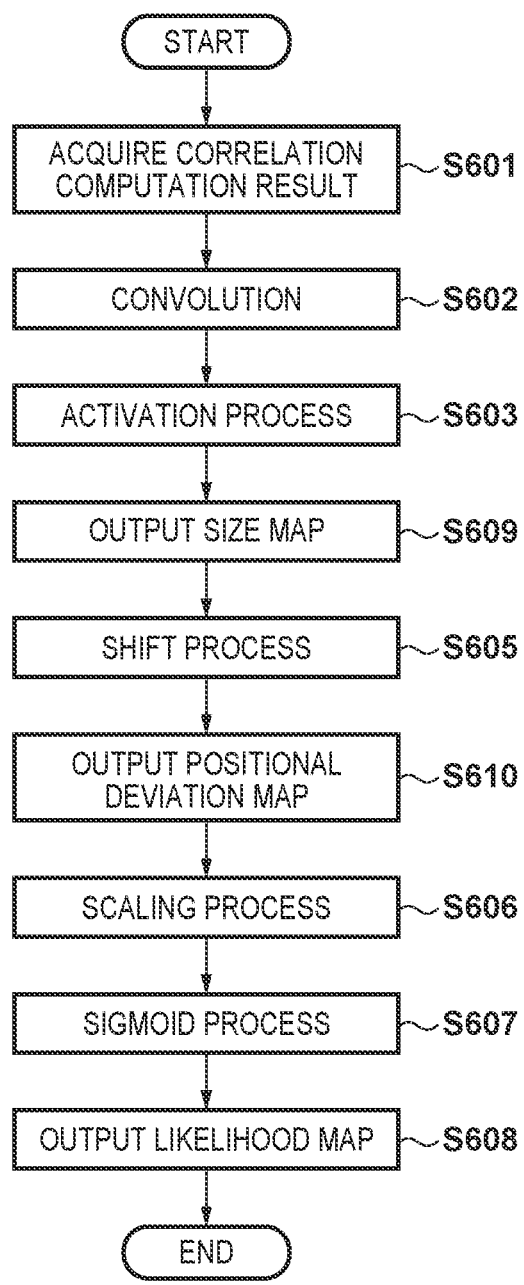

INFORMATION PROCESSING APPARATUS, IMAGE CAPTURING APPARATUS, METHOD, AND NON-TRANSITORY COMPUTER READABLE STORAGE MEDIUM

BACKGROUND OF THE INVENTION

Field of the Invention

The present invention relates to an information processing apparatus, an image capturing apparatus, a method, and a non-transitory computer readable storage medium.

Description of the Related Art

A neural network (referred to as NN) is a mathematical model that emulates a part of the neural circuit of the human brain, and includes a combination of a plurality of perceptrons. The perceptron multiplies input data with a weight, adds a bias to the product, processes the result with an optional function (referred to as activation function), and outputs the processed result. The activation function includes a sigmoid function, a hyperbolic tangent function, a Rectified Linear Unit (ReLU), a function similar to a ReLU (leaky ReLU, Parametric ReLU, ELU, etc.). New activation functions are devised on a daily basis. In particular, the sigmoid function is used immediately before the final output in binary classification. When performing binary classification, an NN outputs a binary value (0 or 1). Therefore, the values to be output from neurons of the NN must be in a range of 0 to 1. The sigmoid function performs processing of the binary classification.

On the other hand, an NN may be quantized and implemented as hardware in order to realize faster arithmetic processing of the NN. In this case, the activation function (e.g., ReLU) that provides an output whose minimum value is limited may already be implemented as hardware. Here, when a final output provided by the activation function (e.g., ReLU) is input to the sigmoid function, the sigmoid function outputs a value in a narrower range (e.g., range of 0.5 to 1) than the range of 0 to 1. This is because the minimum value (e.g., 0) of the output of the activation function to be input to the sigmoid function is larger than the minimum value (e.g., negative value) of the output for causing the sigmoid function to output a value in the range of 0 to 1. Accordingly, the value output from the sigmoid function is in a narrower range than the range of 0 to 1, which may reduce the prediction accuracy in tasks related to object detection, object recognition, object classification or the like performed by the NN.

Therefore, in Japanese Patent Laid-Open No. 2020-160564 hardware provided with an arithmetic operation unit having a plurality of activation functions is prepared, and an activation function that provides outputs with an unlimited minimum value is used.

SUMMARY OF THE INVENTION

The present invention in its one aspect provides an information processing apparatus comprising a shifting unit configured to shift an output of an activation function corresponding to an input, based on an output range of the activation function, a scaling unit configured to scale the output of the activation function, the output of the activation function having been shifted by the shifting unit, and an output unit configured to output an output value corresponding to the output of the activation function, the output of the activation function having been scaled by the scaling unit, the activation function is a function in which the minimum value of the output of the activation function corresponding to the input is equal to or larger than a predetermined value.

The present invention in its one aspect provides a method comprising shifting an output of an activation function corresponding to an input, based on an output range of the activation function, scaling the output of the activation function, the output of the activation function having been shifted, and outputting an output value corresponding to the output of the activation function, the output of the activation function having been scaled, the activation function is a function in which the minimum value of the output of the activation function corresponding to the input is equal to or larger than a predetermined value.

The present invention in its one aspect provides a non-transitory computer-readable storage medium storing a program that, when executed by a computer, causes the computer to perform a method comprising shifting an output of an activation function corresponding to an input, based on an output range of the activation function, scaling the output of the activation function, the output of the activation function having been shifted, and outputting an output value corresponding to the output of the activation function, the output of the activation function having been scaled, the activation function is a function in which the minimum value of the output of the activation function corresponding to the input is equal to or larger than a predetermined value.

Further features of the present invention will become apparent from the following description of exemplary embodiments (with reference to the attached drawings).

BRIEF DESCRIPTION OF THE DRAWINGS

FIG. 4A is a view illustrating an example of a reference image and a search image;

FIG. 4B is a view illustrating an example of a reference image and a search image;

FIG. 6A is a flowchart for explaining details of the processing at step S309 of FIG. 3;

FIG. 6B is a flowchart for explaining details of the processing at step S309 of FIG. 3;

DESCRIPTION OF THE EMBODIMENTS

Figure 1:
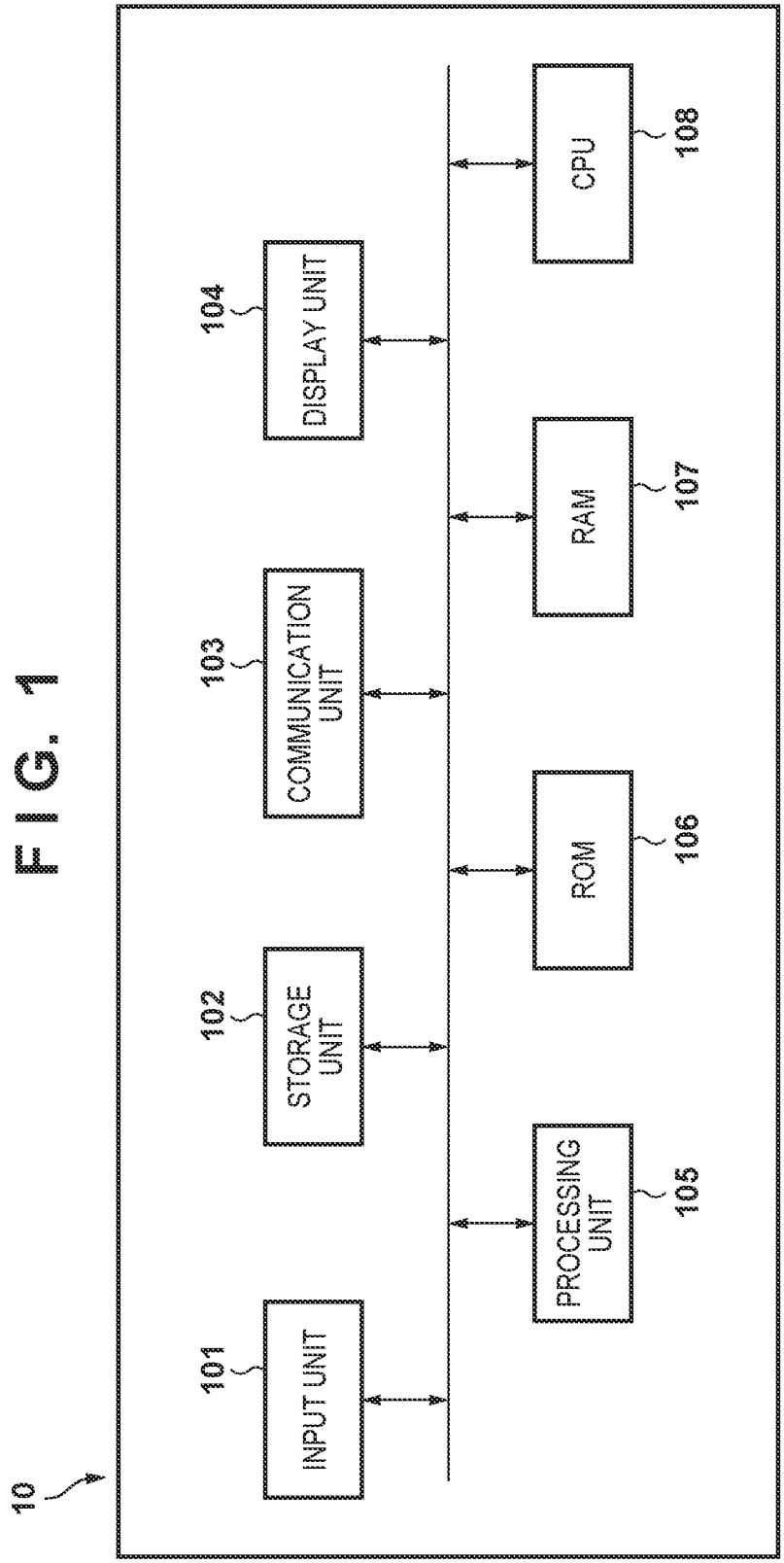
FIG. 1 is a view illustrating an example of a hardware configuration of an information processing apparatus.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

According to the present invention, an activation function can output a predetermined output value.

First Embodiment

An information processing apparatus shifts an output of an activation function with respect to an input, based on an output range of the activation function, and scales the shifted output of the activation function. The information processing apparatus outputs an output value corresponding to the scaled output of the activation function. An activation function is a function in which the minimum value of the output of the activation function corresponding to an input is equal to or larger than a predetermined value.

Therefore, the information processing apparatus performs a two-stage output change process between the output provided by the activation function (e.g., ReLU) and the output provided by the sigmoid function. The two-stage output change process, which includes a shifting process and a scaling process, may further include other output change processes. The present embodiment may be used as an image capturing apparatus (e.g., camera) having an information processing apparatus installed therein. Here, the predetermined value is 0, for example. The output value corresponding to the output of the activation function is in a range of 0 to 1, for example.

FIG. 1 is a view illustrating an example of a hardware configuration of an information processing apparatus. An information processing apparatus 10, which is an apparatus configured to process an image, includes a PC, for example. The information processing apparatus 10 includes an input unit 101, a storage unit 102, a communication unit 103, a display unit 104, a processing unit 105, a ROM 106, a RAM 107, and a CPU 108. Here, the information processing apparatus 10 may process data other than images such as audio data or data acquired from various sensors, for example. Although the information processing apparatus 10 is installed in an image capturing apparatus (not illustrated) that captures an image of a subject, the information processing apparatus 10 may also be installed in various mobile terminals (smart phones, tablets, or the like), without being limited to an image capturing apparatus.

The input unit 101 is a device (corresponding to an acceptance unit) configured to accept various types of data input from a user or the like, and includes a keyboard, a mouse, a pointer, a button or the like, for example.

The storage unit 102 is a device configured to store image data, programs, or the like, and includes a hard disk, a flexible disk, a CD-ROM, a CD-R, a DVD, a memory card, a CF card, or a smart medium, for example. The storage unit 102 further includes an SD card, a memory stick, an xD picture card, a USB memory, or the like. In addition, the storage unit 102 may be used as a part of the RAM 107. In addition, an external storage device (not illustrated) connected to the information processing apparatus 10 via the communication unit 103 may be used as a replacement of the storage unit 102.

The communication unit 103 is an interface (I/F) that connects between respective units of the information processing apparatus 10. Although FIG. 1 illustrates a configuration in which the input unit 101, the storage unit 102, and the display unit 104 are all included in the information processing apparatus 10, other configurations are possible without being limited thereto. For example, the input unit 101, the storage unit 102, and the display unit 104 may be connected with each other via a communication path in accordance with a known communication scheme.

The display unit 104 displays (or notifies) images before and after image processing, and images of a graphical user interface (GUI) or the like. The display unit 104 is configured by including a CRT or a liquid crystal display, and may use a display device of an external device connected via cable or the like. Furthermore, the display unit 104 and the input unit 101 may be one same device such as a well-known touch screen. In such a case, the input unit 101 accepts an input of a user and the like on the touch screen. Here, the image capturing apparatus (not illustrated) may include the display unit 104.

The processing unit 105 performs processing of data in the RAM 107, and outputs the result of data processing to the storage unit 102 (or the RAM 107). The processing unit 105 may be configured by a hardware using, for example, a dedicated logic circuit and a memory (ROM 106 or RAM 107). Alternatively, the processing unit 105 may be configured by a software with the CPU 108 executing programs stored in the memory (ROM 106 or RAM 107) by.

The ROM 106 is a read-only non-volatile memory. The ROM 106 includes programs, data, work areas or the like for the CPU 108 to execute various processes.

RAM 107 is a volatile memory configured for reading and writing. The RAM 107 includes programs, data, work areas or the like for the CPU 108 to perform various processes.

The CPU 108 is a processor that performs overall control of each unit in the information processing apparatus 10. The CPU 108 performs image processing and image recognition of a video (a plurality of still image frames) based on the result of data processing performed by the processing unit 105. The CPU 108 stores, in the RAM 107, the results of image processing and image recognition. The CPU 108 writes, in the RAM 107, a program in the storage unit 102 or the ROM 106, and subsequently executes the program. Alternatively, in a case where a program is received via the communication unit 103, the CPU 108 stores, in the storage unit 102, the program and subsequently writes the program to the RAM 107, or writes the program directly from the communication unit 103 to the RAM 107, and then executes the program. Although FIG. 1 illustrates one CPU 108, a plurality of the CPUs 108 may be provided. Here, the CPU 108 may function as a replacement of the processing unit 105.

Next, there will be described a Siam method that tracks a specific subject in a search image with a high accuracy based on a reference image, as an example of learning and inference of the neural network executed by the processing unit 105 and the CPU 108 in the embodiment of the present invention.

Figure 2:
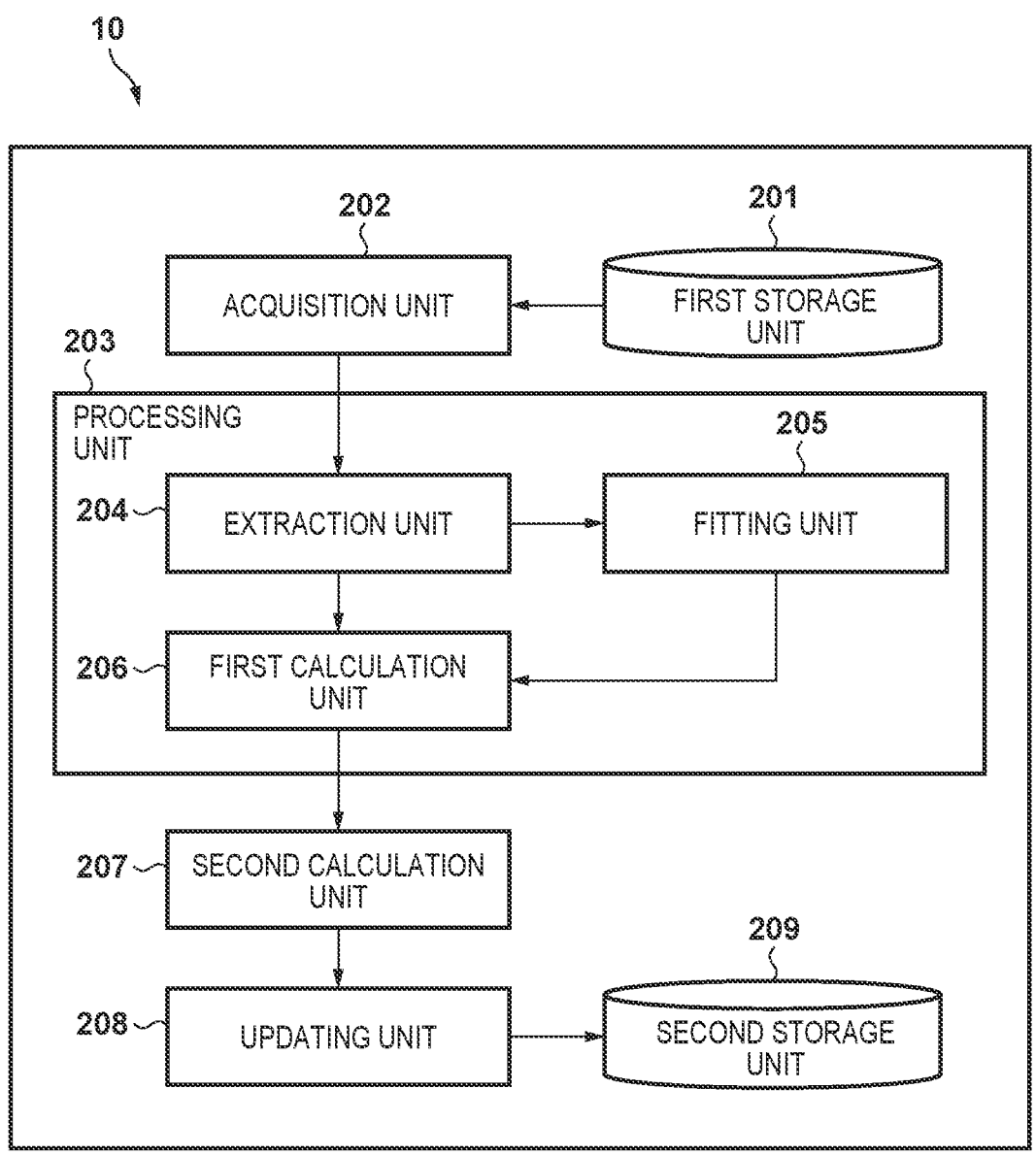
FIG. 2 is a view illustrating an example of a functional configuration of the information processing apparatus during learning.

FIG. 2 is a view illustrating an example of a functional configuration of the information processing apparatus during the learning. The information processing apparatus 10 includes a first storage unit 201, an acquisition unit 202, a processing unit 203, a second calculation unit 207, an updating unit 208, and a second storage unit 209.

The acquisition unit 202 acquires the reference image and the search image in the first storage unit 201, and correct answer data of the position and the size of the object existing in the reference image and the search image, respectively. In the following, the correct answer data will be referred to as GT (abbreviation for Ground Truth). The reference image is an image including a tracking target. The search image is an image used for searching a tracking target.

The processing unit 203 includes an extraction unit 204, a fitting unit 205, and a first calculation unit 206.

The extraction unit 204 inputs each of the acquired reference image and the search image to a feature extraction neural network (NN) to extract the feature map from each of the reference image and the search image.

The fitting unit 205 updates a parameter of the correlation calculation layer based on respective feature maps of the reference image and the search image. For example, the fitting unit 205 clips a surrounding region of the tracking target from the feature map of the reference image acquired from the feature extraction NN of the extraction unit 204, and acquires a template feature. The fitting unit 205 then sets the "template feature" to the parameter of the correlation calculation layer.

The first calculation unit 206 performs correlation calculation, in the correlation calculation layer, between the parameter of the correlation calculation layer (template feature) and the "feature of the search image" extracted by the extraction unit 204 from the search image. Here, the feature of the search image refers to an output of the final layer of the feature extraction neural network of the extraction unit 204. The first calculation unit 206 then inputs the feature map acquired from the correlation calculation layer to a tracking target detection neural network (NN). The first calculation unit 206 uses the tracking target detection NN to estimate the position and the size of the tracking target on the search image, based on a size map, a positional deviation map, and a likelihood map that strongly responds to the position where the tracking target exists.

The second calculation unit 207 calculates an error, based on the estimation result of the position and the size of the tracking target on the search image estimated by the first calculation unit 206, and GT data of the search image acquired by the acquisition unit 202.

Based on the error, the updating unit 208 updates respective parameters of the feature extraction NN of the extraction unit 204 and the tracking target detection NN of the first calculation unit 206, and stores (saves) the updated parameters in the second storage unit 209.

Figure 3:
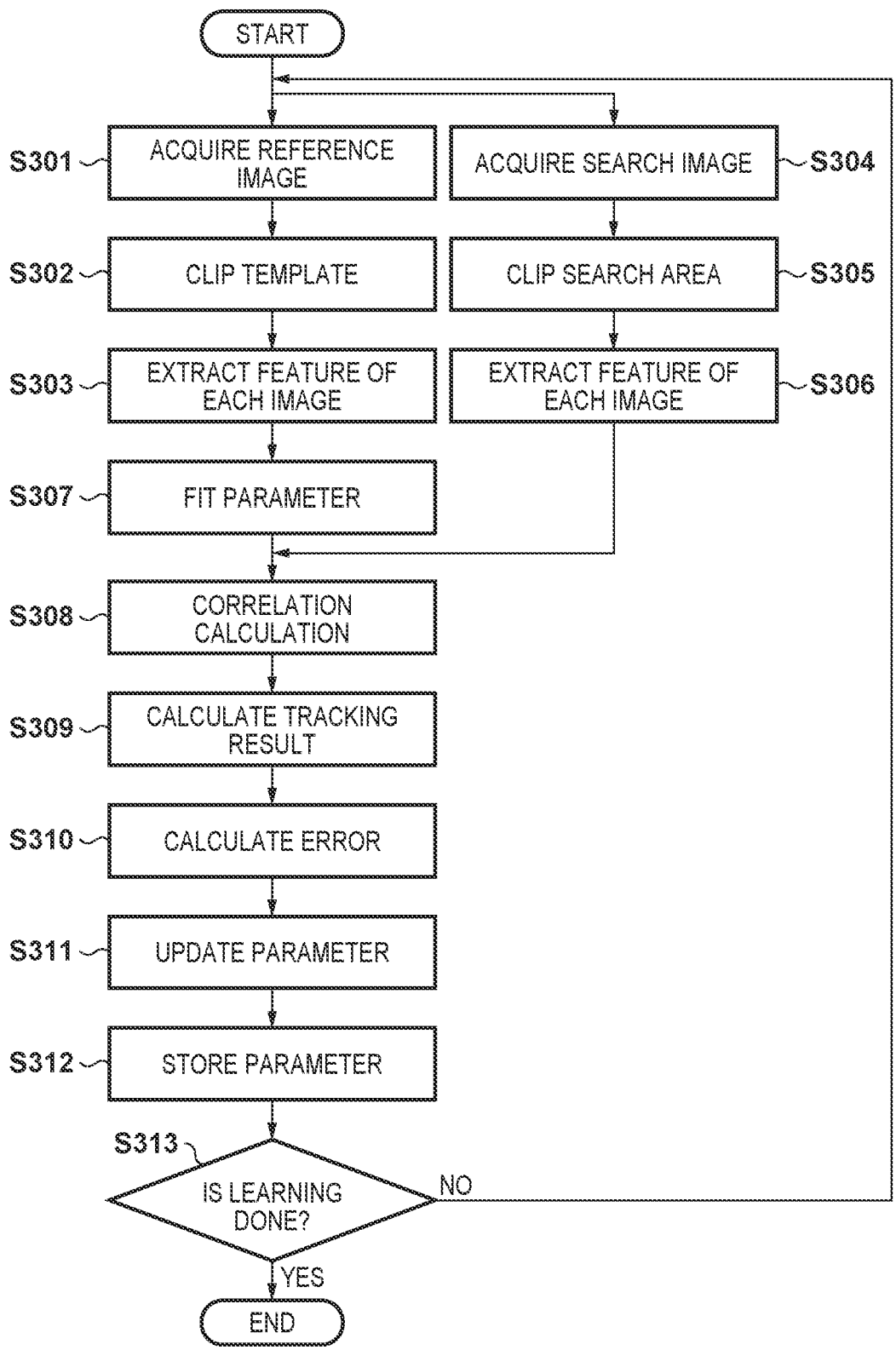
FIG. 3 is a flowchart for explaining a learning process of a neural network.

FIG. 3 is a flowchart for explaining a learning process of a neural network. However, the information processing apparatus 10 may not necessarily perform all the processes of the flowchart.

At S301, the acquisition unit 202 acquires an image (reference image) including the tracking target, and a GT of the center position and the size (width and height) of the tracking target in the reference image.

Here, FIGS. 4A and 4B are views illustrating an example of a reference image and a search image, respectively. FIG. 4A illustrates an example of a reference image. A reference image 400 includes a tracking target 401, GT 402 (correct answer data of position and size of tracking target 401), and a region 403. FIG. 4B illustrates an example of a search image. The search image 404 includes a tracking target 405, GT 406 (correct answer data of position and size of tracking target 405), and a region 407.

At S302, the acquisition unit 202 clips the region 403 surrounding the tracking target 401 in the reference image 400 as "template image" based on the GT 402, and resizes the template image. For example, the acquisition unit 202 acquires a "template image" by clipping a region in a constant multiple size of the size of the tracking target 401 from the reference image 400, with the position of the tracking target 401 on the reference image 400 being the center.

At S303, the extraction unit 204 inputs, to the feature extraction NN, the "template image" corresponding to the region 403, and acquires a feature of the tracking target 401 on the template image (referred to as template feature).

At S304, the acquisition unit 202 acquires a group (set) of the search image 404 (image for searching the tracking target 405) and the GT 406 (position and size of the tracking target 405) in the search image 404. For example, the acquisition unit 202 acquires, as the search image 404, an image at a different time point in the same sequence as that of the reference image 400 acquired at S302.

At S305, the acquisition unit 202 clips the region 407 surrounding the tracking target 405 in the search image 404 as a "search image of interest" based on the GT 406, and resizes the search image of interest. For example, the acquisition unit 202 acquires a "search image of interest" by clipping a region in a constant multiple size of the size of the tracking target 405 from the search image 404, with the position of the tracking target 405 being the center.

At S306, the extraction unit 204 inputs, to the feature extraction NN, the "search image of interest" corresponding to the region 407, and acquires a feature of the tracking target 405 on the search image of interest (referred to as feature of search image of interest). Here, although the processed of "S301 to 303" and the processes of "S304 to 306" are performed in parallel, either one of the processes may be started after the other has been completed.

At S307, the fitting unit 205 sets the template feature to the parameter of the correlation calculation. The fitting unit 205 also performs a shifting process and a scaling process in a case where the maximum value and the minimum value of the output are limited in setting of the parameter of the correlation calculation.

At S308, the first calculation unit 206 performs correlation calculation between the feature of the search image of interest and the parameter (template feature).

At S309, the first calculation unit 206 (corresponding to an output unit) outputs a likelihood map, a size map, and a positional deviation map by inputting a correlation calculation result to the tracking target detection NN.

Figure 5A:
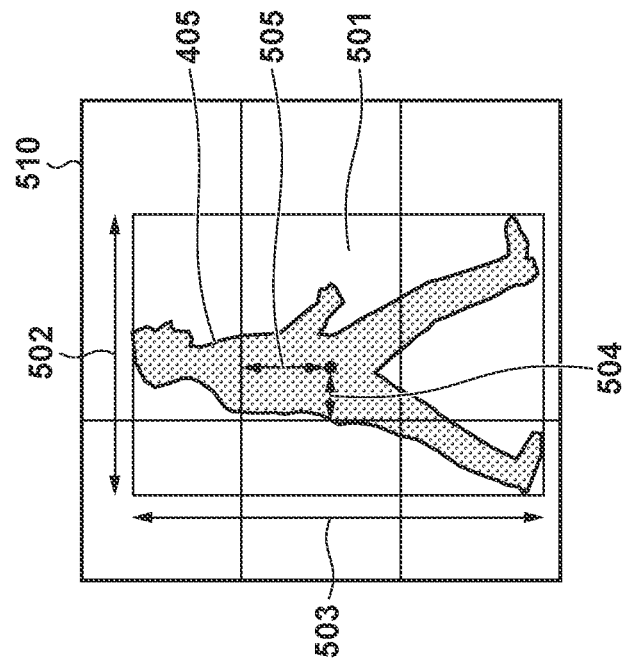
FIG. 5A is a view illustrating an example of a likelihood map, a size map, and a positional deviation map.
Figure 5B:
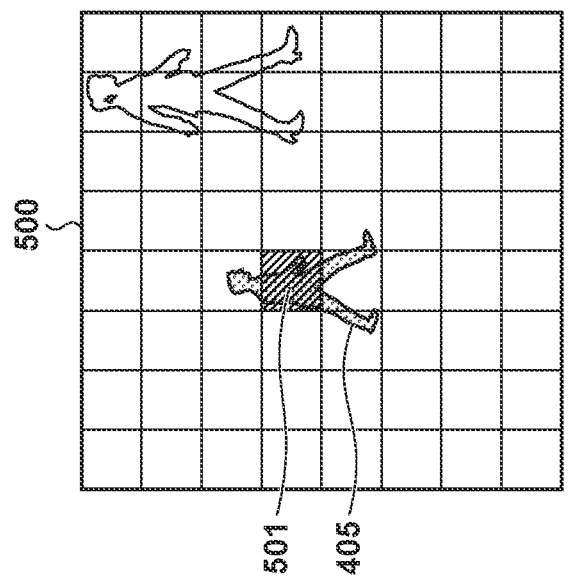
FIG. 5B is a view illustrating an example of a likelihood map, a size map, and a positional deviation map.

Here, FIGS. 5A to 5B are views illustrating an example of a likelihood map, a size map, and a positional deviation map. FIG. 5A illustrates the likelihood map. FIG. 5B is a magnified view illustrating the size map and the positional deviation map of the tracking target of FIG. 5A.

A likelihood map 500 in FIG. 5A represents an estimation result indicating a position where the tracking target exists with a high probability. In the likelihood map 500, each box (pixel) defined by a preliminarily partitioned lattice-like grid takes a real value in a range of 0 to 1. For example, when the value of a pixel 501 on the likelihood map 500 is relatively larger than the value of other pixels on the likelihood map 500, it is indicative that the existence probability of the tracking target 405 is high.

A size map 510 in FIG. 5B represents the estimation results of a width 502 and a height 503 of the tracking target 405. In addition, the positional deviation map is a map that is shared with size map 510. The positional deviation map represents an estimation result of the positional deviation of the tracking target 405 in a region including the pixel 501 on the likelihood map 500 and eight pixels in the vicinity of the pixel 501. For example, the positional deviation map represents the estimation results of a lateral deviation 504 (illustrated by an arrow) and a longitudinal deviation 505

(illustrated by an arrow) of the center (illustrated by a black dot) of the tracking target 405, with the top left of the pixel 501 being a reference point.

Here, FIGS. 6A and 6B are flowcharts for explaining details of the processing at step S309 of FIG. 3.

At S601, the first calculation unit 206 acquires the correlation calculation result calculated based on the template feature and the feature of the search image of interest.

At S602, the first calculation unit 206 inputs the correlation calculation result to the tracking target detection NN and performs a convolution operation.

At S603, the first calculation unit 206 performs processing on the convolution operation result using an activation function. Here, the activation function is an activation function (e.g., ReLU) that provides an output whose minimum value is limited. In other words, the minimum value and the maximum value of the processing result (output result) provided by the activation function are determined by the following Formula 1.

$$f(x) = \begin{cases} 0, & x < 0 \\ x, & x \geq 0 \end{cases} \quad \text{(Formula 1)}$$

where f(x) is an activation function, and x is input data. According to Formula 1, the minimum value is a value that takes 0 in a region where x is less than 0. The maximum value that takes a value equal to or larger than x (including 0) in a region where x is equal to or larger than 0, and the maximum value is a value without an upper limit. Although a ReLU has been used as an activation function, the activation function is not limited to the ReLU and other activation functions may be used which provide an output whose minimum value is limited. However, the minimum value is assumed not to be less than 0 that is a negative value (i.e., it takes a value equal to or larger than 0) across the entire domain of definition.

At S604, the first calculation unit 206 outputs the size map and the positional deviation map using the tracking target detection NN. Here, the output range (range from the maximum value to the minimum value) provided by the activation function at S603 must include the output range of the GT of the size map and the positional deviation map.

At S605, the first calculation unit 206 shifts (changes) the maximum value and the minimum value of the output provided at S603 by the activation function. For example, the first calculation unit 206 performs a shifting process on the maximum value and the minimum value of the output by adding a constant to the maximum value and the minimum value of the output, or subtracting a constant from the maximum value and the minimum value of the output. For example, when the maximum value and the minimum value of the output are expressed as [0, 255], the first calculation unit 206 subtracts 128 from [0, 255] to acquire [−128 (=0−128), 127 (=255−128)]. When, on the other hand, the maximum value and the minimum value of the output are expressed as [−255, 0], the first calculation unit 206 adds 128 to [−255, 0] to acquire [−127 (=−255+128), 128 (=0+128)]. The reason for performing the shifting process is to expand the output range (range from the maximum value to the minimum value) provided by the sigmoid function when the sigmoid function processes the output provided by the shifting process. Here, the following Formula 2 indicates a sigmoid function.

$$f(x) = \frac{1}{1+e^{-x}} \quad \text{(Formula 2)}$$

where f(x) is a sigmoid function, and x is input data. The sigmoid function outputs 0.5 when the input data x is 0, provides an output that converges to 1 as the input data x becomes larger than 0, and provides an output converges to 0 as the input data x becomes smaller than 0. In other words, when the minimum value of the output provided by the activation function (ReLU) is 0, the minimum value of the output provided by the sigmoid function is 0.5. In addition, when the maximum value of the output provided by the activation function (ReLU) is 0, the maximum value of the output provided by the sigmoid function is 0.5. As such, there occurs a deviation (=|0-0.5|) between the minimum value (0) of output provided by the activation function (ReLU) and the minimum value (0.5) of the output provided by the sigmoid function. Therefore, the sigmoid function cannot output a value smaller than 0.5 when the minimum value of the output provided by the ReLU is 0. In addition, there occurs a deviation (=|0-0.5|) between the maximum value (0) of the output provided by the activation function (ReLU) and the maximum value (0.5) of the output provided by the sigmoid function. Therefore, the sigmoid function cannot output a value equal to or larger than 0.5 when the maximum value of the output provided by the ReLU is 0.

Based on the aforementioned problems, the first calculation unit 206 performs a shifting process on the output provided by the activation function (ReLU) to provide the maximum value and the minimum value of the output which cover both positive and negative values. Accordingly, the maximum value of the output provided by the sigmoid function can take a value equal to or larger than 0.5, and the minimum value of the output can take a value equal to or smaller than 0.5. The value that shifts the maximum and the minimum values of the output (referred to as shift value) is determined by the following Formula 3.

shift value=−(maximum value−minimum value)/2 (Formula 3)

Here, the shift value is a value for changing the output range (range from the maximum value to the minimum value) provided by the activation function. The maximum value is the maximum value of the output provided by the activation function. The minimum value is the minimum value of the output provided by the activation function. The first calculation unit 206 corrects, with the shift value, the minimum value (e.g., 0) and the maximum value (e.g., 255) of the output provided by the activation function (ReLU). The output range provided by the corrected activation function is then expressed as [minimum value/2−maximum value/2, maximum value/2−minimum value/2]. Here, the minimum value of the output provided by the activation function takes a negative value and the maximum value takes a positive value, and therefore the mean of the minimum value and the maximum value becomes 0. Accordingly, the mean of the output range of the sigmoid function becomes 0.5.

At S606, the first calculation unit 206 further performs a scaling process on the output subjected to the shifting process and acquires an output. The scaling process is a process for changing the output range provided by the shifting process by multiplying a constant to the output range (range from the maximum value to the minimum value) provided by the shifting process. For example, when the output range acquired at S605 is [−128, 128], the first calculation unit 206 calculates [−10(=−128×10/128), 10

(=128×10/128)] by multiplying the output range by 10/128. The reason for performing the scaling process is to cause the sigmoid function to output a predetermined output value (0 to 1). When, for example, the output range provided by the shifting process (range from the maximum value to the minimum value) is narrow, the output range of the sigmoid function also becomes narrow. Therefore, the first calculation unit 206 can expand the output range by performing scaling process on the output range provided by the shifting process using the value used for the scaling process (value larger than 1). In the following, the value used for the scaling process is referred to as "scale value".

Accordingly, the sigmoid function can output a predetermined output value (0 to 1), based on the output range provided by the scaling process. When, on the other hand, the output range (range from the maximum value to the minimum value) provided by the shifting process is too wide, the first calculation unit 206 outputs, as the output provided by the sigmoid function, a value as close to 0 as possible (the minimum value) or a value as close to 1 as possible (the maximum value). The maximum value and the minimum value of the output provided by the sigmoid function makes it difficult to reduce the value of Lossc described below, which may hinder the learning of the NN. In such a case, the first calculation unit 206 can perform a scaling process, using a scale value smaller than 1, on the output range (range from the maximum value to the minimum value) provided by the shifting process to narrow the output range provided by the shifting process. Here, there is also a case where the first calculation unit 206 may not perform the scaling process on the output range provided by the shifting process. For example, the first calculation unit 206 may determine whether or not to perform the scaling process based on whether or not the absolute value of the maximum value and the minimum value of the output range [−10, 10] acquired at S605 exceed a threshold value (e.g., 5). The threshold value may be any value, provided that the threshold value is finally within a range in which the learning of the NN proceeds. Accordingly, the first calculation unit 206 is not necessary to perform the scaling process for the output range acquired at S605 at each time, thereby the processing speed can be increased.

At S607, the first calculation unit 206 acquires the output value of the predetermined range (0 to 1) provided by the sigmoid function, by inputting the output provided by the scaling process to the sigmoid function. Referring to S603 to S606, a method has been described for changing the output range (range from the maximum value to the minimum value) provided by the activation function (ReLU), to make the sigmoid function output a predetermined value. In the following, there will be described a method that makes the sigmoid function output a value corresponding to a predetermined range (0 to 1) using a specific value of the output provided by the activation function (ReLU). When, for example, the output provided by the activation function (ReLU) is "10", the first calculation unit 206 calculates "−117" as an output corresponding to the output range [−127, 128] after the shifting process. Here, a calculation equation 255−10=128−|X|holds, where X is an output corresponding to the output range after the shifting process. The first calculation unit 206 can calculate, from the aforementioned calculation equation, "X=−117" as an output corresponding to the output range after the shifting process. Alternatively, the first calculation unit 206 may calculate an output corresponding to the output range after the shifting process, based on a table defining the relation between the output provided by the activation function (ReLU) and the output corresponding to the output range after the shifting process. The first calculation unit 206 calculates "−1" as an output corresponding to the output range [−10, 10] after the scaling process, based on the output "−117" of the activation function (ReLU) that has been changed in the shifting process. Here, the calculation equation 128−|−117|=10−|Y|holds, where Y is the output corresponding to the output range after scaling process. The first calculation unit 206 can calculate "Y=−1" as an output corresponding to the output range after the scaling process from the aforementioned calculation equation. Alternatively, the first calculation unit 206 may acquire an output corresponding to the output range after the scaling process, based on a table defining the relation between the output provided by the activation function (ReLU) that has been changed in the shifting process, and the output corresponding to the output range after the scaling process. Finally, the first calculation unit 206 can calculate "0.27" as an output value corresponding to the predetermined range (0 to 1), by inputting, to the sigmoid function (see Formula 2), the output "−1" of the activation function (ReLU) changed in the scaling process.

At S608, the first calculation unit 206 outputs the likelihood map 500 using the tracking target detection NN. In the following, the explanation returns to the flowchart of FIG. 3.

At S310, the second calculation unit 207 calculates an error, based on the inference result of the position and the size of the tracking target 405 (size map 510), and the GT 406. The purpose is to proceed the learning of the tracking target detection NN to enable the tracking target detection NN to correctly detect the tracking target 405. The second calculation unit 207 calculates a loss Lossc related to the likelihood based on the likelihood map 500 and the GT 406, a loss Losss related to the size based on the size map 510 and the GT 406, and a loss Lossl related to the positional deviation.

Lossc is defined in the following Formula 4. In Formula 4, the likelihood map 500 of the tracking target 405 acquired at S309 is denoted by Cinf, and the map of the GT 406 is denoted by Cgt. The second calculation unit 207 acquires Lossc by calculating the sum of cross-entropy losses based on respective pixel values of Cinf and Cgt. Cgt is a map in which the value of a position, where the tracking target 405 exists, is 1, otherwise the value is 0.

$$Loss_c = \frac{1}{N}\sum(-C_{gt}\log(C_{inf}) - (1 - C_{gt})\log(1 - C_{inf})) \quad \text{(Formula 4)}$$

Losss is defined in the following Formula 5. In Formula 5, the size map of the tracking target 405 acquired at S309 is denoted by Sinf, and the map of the GT 406 is denoted by Sgt. The second calculation unit 207 acquires Losss by calculating the sum of square errors, based on respective pixel values of the Sinf and the Sgt.

$$Loss_s = \frac{1}{N}\sum(S_{inf} - S_{gt})^2 \quad \text{(Formula 5)}$$

Lossl is defined in the following Formula 6. In Formula 6, the positional deviation map of the tracking target 405 acquired from S309 is denoted by Linf, the map of the GT 406 is denoted as Lgt, and the Loss is acquired by calculating the sum of square errors, based on respective pixel values of Sinf and Sgt.

$$Loss_l = \frac{1}{N}\sum(L_{inf} - L_{gt})^2 \qquad \text{(Formula 6)}$$

The second calculation unit 207 calculates the sum of the aforementioned three losses to acquire the loss Lossinf (see Formula 7).

$$Loss_{inf} = Loss_c + Loss_s + Loss_l \qquad \text{(Formula 7)}$$

Here, although the aforementioned losses are described in the form of binary cross-entropy or mean square error, description of losses is not limited thereto.

At S311, the updating unit 208 updates the respective parameters of the feature extraction NN and the tracking target detection NN, using back propagation based on the calculated losses. Here, the parameters to be updated are such as a weight coefficient and bias of the neural network at the extraction unit 204, the fitting unit 205, and the first calculation unit 206 in the processing unit 203.

At S312, the updating unit 208 stores the updated parameters in the second storage unit 209. The processing from S301 to S312 is defined as learning of one iteration.

At S313, the updating unit 208 determines whether or not to terminate the learning of the feature extraction NN and the tracking target detection NN, based on a learning termination condition. The learning termination condition may be either when the value of the loss Lossinf acquired in Formula 7 is below a predetermined threshold value, or when the number of learning times of the NN (learning model) exceeds a predetermined number of learning times. Here, the number of learning times refers to the number of updating times the updating unit 208 has updated the parameters of the NN.

Figure 7:
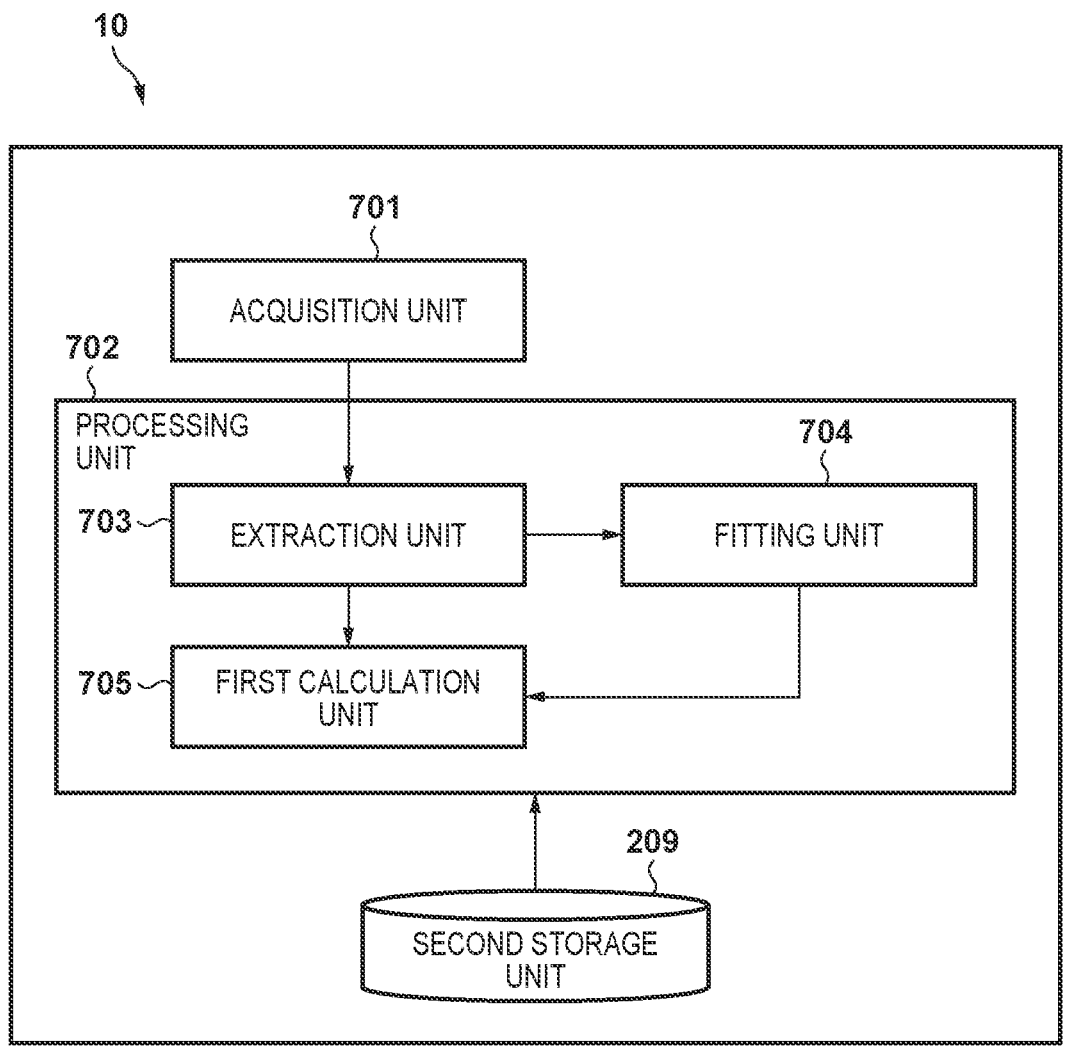
FIG. 7 is a view illustrating an example of a functional configuration of the information processing apparatus during inference.

FIG. 7 is a view illustrating an example of the functional configuration of the information processing apparatus during inference. The information processing apparatus 10 includes an acquisition unit 701, a processing unit 702, and the second storage unit 209. The information processing apparatus 10 uses an NN after learning that is already subjected to the process illustrated in FIG. 3, to estimate the position and the size of the tracking target 405 on the search image 404.

The acquisition unit 701 acquires the reference image 400 and the search image 404.

The processing unit 702 includes an extraction unit 703, a fitting unit 704, and a calculation unit 705.

The extraction unit 703 inputs each of the acquired reference image 400 and the search image 404 to the feature extraction NN to extract a feature map from each of the reference image 400 and the search image 404.

The fitting unit 704 updates a parameter of the correlation calculation layer based on respective feature maps of the reference image 400 and the search image 404. For example, the fitting unit 704 clips a surrounding region 403 of the tracking target 401 from the feature map of the reference image 400 acquired from the feature extraction NN of the extraction unit 703, and acquires a template feature. The fitting unit 704 then sets the "template feature" to the parameter of the correlation calculation layer.

The calculation unit 705 performs correlation calculation, in the correlation calculation layer, between the parameter of the correlation calculation layer (template feature) and the "feature of the search image 404" extracted by the extraction unit 703 from the search image 404. In addition, the feature of the search image 404 refers to an output of the final layer of the feature extraction NN of the extraction unit 703. The calculation unit 705 then inputs the feature map acquired from the correlation calculation layer to the tracking target object detection NN. The calculation unit 705 uses the tracking target object detection NN to estimate the position and the size of the tracking target 405 on the search image 404, based on the size map, and the positional deviation map, and the likelihood map that strongly responds to the position where the tracking target 405 exists.

The second storage unit 209 has stored therein parameters, which are updated by the updating unit 208 during learning, of the feature extraction NN and the tracking target object detection NN in the processing unit 702.

Figure 8:
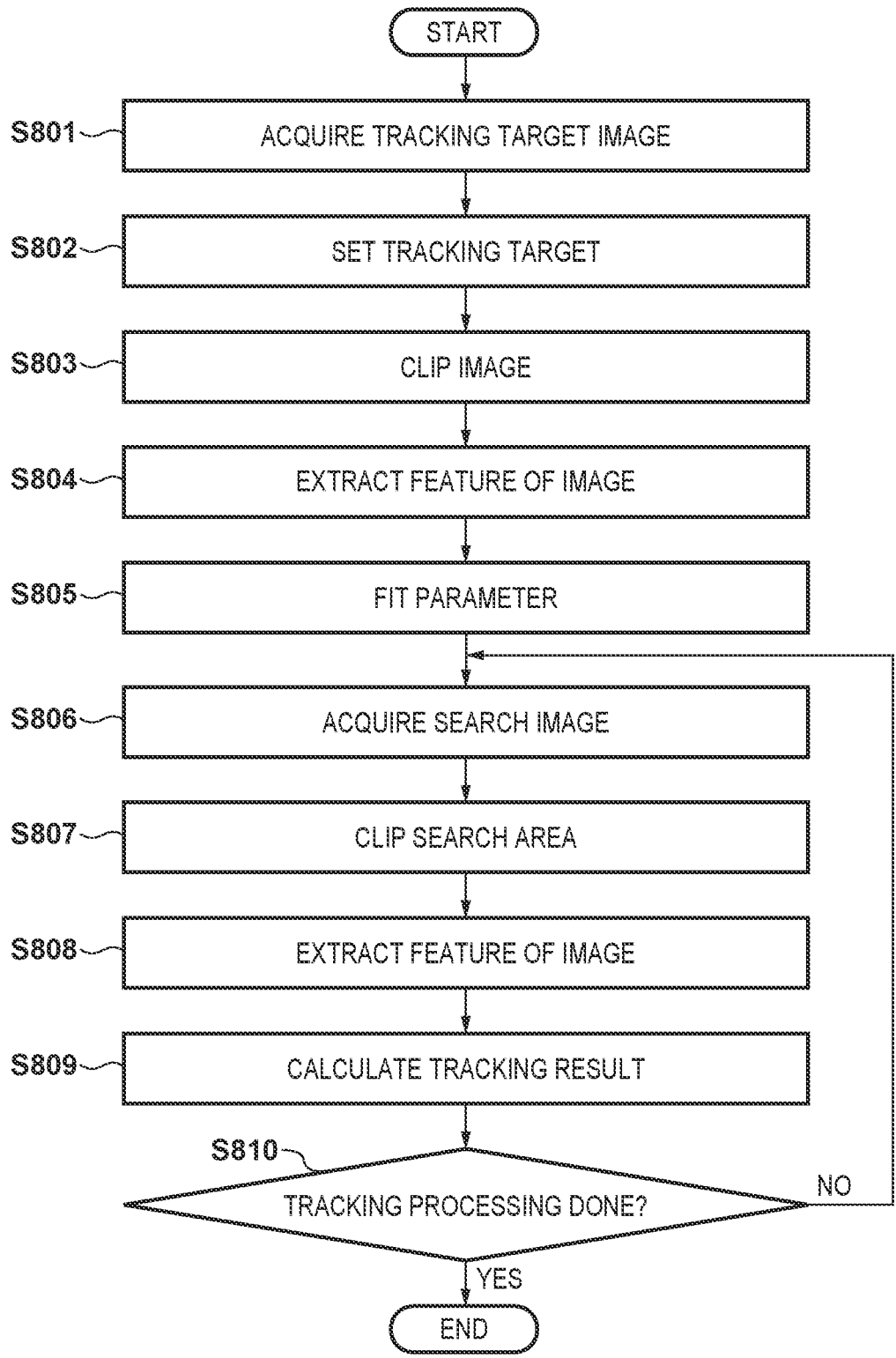
FIG. 8 is a flowchart for explaining an inference process of a neural network.

FIG. 8 is a flowchart for explaining the inference process of the neural network. However, the information processing apparatus 10 may not necessarily perform all the processes of the flowchart.

At S801, the acquisition unit 701 acquires the reference image 400 including the tracking target 401.

At S802, the user touches and specifies the tracking target 401 on the reference image 400 displayed on a screen or the like by the display unit 104. Here, an object detector may detect and specify the tracking target 401 in the reference image 400 in place of the user.

At S803, the acquisition unit 701 acquires a "template image" by a method similar to that during learning, by clipping a region in a constant multiple size of the size of the tracking target 401 from the reference image 400, with the position of the tracking target 401 on the reference image 400 being the center.

At S804, the extraction unit 703 inputs the "template image" corresponding to the region 403 to the feature extraction NN, and acquires the feature of the tracking target 401 on the template image (referred to as template feature).

At S805, the fitting unit 704 sets the template feature to the parameter of the correlation calculation. The fitting unit 704 also performs the shifting process and the scaling process in a case where the maximum value and the minimum value of the output are limited when setting the parameter of the correlation calculation.

At S806, the acquisition unit 701 acquires the search image 404 (image for searching the tracking target 405). For example, the acquisition unit 701 acquires, as the search image 404, an image captured at the next time point X+1 subsequent to the reference image 400 captured at the time X.

At S807, the acquisition unit 701 clips the region 407 surrounding the tracking target 405 in the search image 404 as a "search image of interest", and resizes the search image of interest. For example, the acquisition unit 701 determines the region 407 to be clipped from the search image 404, based on the region surrounding the tracking target 401 estimated from the reference image 400.

At S808, the extraction unit 703 inputs, to the feature extraction NN, the "search image of interest" corresponding to the region 407 to acquire the feature of the tracking target 405 on the search image of interest (referred to as the feature of the search image of interest).

At S809, the calculation unit 705 performs correlation calculation between the feature of the search image of interest and the parameter (template feature). The calculation unit 705 then outputs the likelihood map, the size map, and the positional deviation map by inputting the result of correlation calculation to the tracking target detection NN.

Here, the calculation unit 705 acquires the likelihood map, the size map, and the positional deviation map by performing processing on the correlation calculation result by using a similar method to that during learning (process illustrated in FIG. 6A) and the tracking target detection NN.

Specifically, at S603, the calculation unit 705 uses an activation function (ReLU) that provides an output whose minimum value is limited. The calculation unit 705 executes S605 (shifting process) and S606 (scaling process) between S603 (activation process) and S607 (sigmoid process).

At this time, the shift value and the scale value are constants, and therefore the shift value and the scale value during inference are similar to the values during learning. For example, the shift value is acquired by multiplying −½ to the difference between the maximum value and the minimum value defining the output range provided by the activation function as illustrated in Formula 3. The scale value is larger than 1 when the output range provided by the shifting process is smaller than a threshold value (range from the maximum value to the minimum value). When, on the other hand, the output range provided by the shifting process is larger than the threshold value (range from the maximum value to the minimum value), the scale value is smaller than 1. The threshold value may be an arbitrary value. Accordingly, the calculation unit 705 can acquire an output value corresponding to the predetermined range (0 to 1) provided by the sigmoid process in the inference using the tracking target detection NN.

At S810, the calculation unit 705 terminates tracking of the tracking target 405 on the search image of interest, based on whether or not the likelihood map, the size map, and the positional deviation map have all been calculated. Upon determining that the likelihood map, the size map, and the positional deviation map have all been calculated (Yes at S810), the calculation unit 705 terminates the process. Upon determining that not all of the likelihood map, the size map, and the positional deviation map have been calculated (NO at S810), the calculation unit 705 returns the process to S806.

As has been described above, according to the first embodiment, an output value corresponding to a predetermined range can be output, by changing the output provided by the activation function through a two-stage change process. According to the first embodiment, the learning accuracy of the NN is improved by performing the learning of the NN using a predetermined output, whereby the tracking target can be tracked with a high accuracy.

Second Embodiment

In the first embodiment, the first calculation unit 206 performs the scaling process on the output of the activation function (ReLU) using a constant scale value at S606 of FIG. 6A. In a second embodiment, in contrast, an optimal scale value is determined by the learning of the feature extraction NN and the tracking target detection NN. The second embodiment will be described, focusing on the difference from the first embodiment.

When the output range (range from the maximum value to the minimum value) provided by the shifting process (S605) is narrow, the output range (range from the maximum value to the minimum value) provided by the sigmoid process (S607) is also narrow. On the other hand, when the output range (range from the maximum value to the minimum value) provided by the shifting process (S605) is wide, the output range (range from the maximum value to the minimum value) by the sigmoid process (S607) is wide. In any of the aforementioned cases, the sigmoid function outputs a value as close to 0 as possible, or as close to 1 as possible. The foregoing may hinder the learning of the feature extraction NN and the tracking target detection NN. Furthermore, since the bit width is determined by quantization, in a case where the output range provided by the scaling process is expanded, a quantization error may be significant, making it difficult to reduce the loss Lossc. Therefore, it is necessary to appropriately perform the scaling process on the output range (range from the maximum value to the minimum value) provided by the shifting process.

The optimal scale value refers to a value that brings the output provided by the sigmoid process closer to the GT. Therefore, an initial value is set by defining the scale value as a variable that can be learned by the NN, in addition to the weight coefficient and the bias of the NN in the extraction unit 204, the fitting unit 205, and the first calculation unit 206. For example, a value 1 is set as the initial value. The second calculation unit 207 then calculates the loss according to Formula 4, based on the estimation results (likelihood map, size map, and positional deviation map) of the tracking target 405 by the NN. The updating unit 208 updates the scale value by using back propagation, based on the loss and the GT 406. For example, the second calculation unit 207 calculates, by the following Formula 8, the gradient of the scale value k of the error function E for calculating the loss Lossc expressed by Formula 4, based on back propagation.

$$\frac{\partial E}{\partial k} = \frac{\partial E}{\partial y}\frac{\partial y}{\partial k} \quad \text{(Formula 8)}$$

where y is the sigmoid function expressed by Formula 2, and ∂E/∂y is the gradient acquired by backpropagating from the sigmoid function after the scaling process. In addition, the gradient ∂y/∂k is calculated by the following Formula 9, where x is the input of the scale value.

$$\frac{\partial y}{\partial k} = (1-y)y \cdot x \quad \text{(Formula 9)}$$

The updating unit 208 then updates, based on the gradient, the scale value k using the momentum method expressed by the following Formula 10.

$$\Delta k = \alpha \Delta k + \eta \frac{\partial y}{\partial k} \quad \text{(Formula 10)}$$

where α is the momentum coefficient, and η is the learning rate. For example, the updating unit 208 sets the momentum coefficient α to 0.9, and sets the learning rate η to 0.001.

As has been described above, according to the second embodiment, a scale value, which brings the output value closer to the GT by the learning of the NN, can be determined, whereby the tracking target can be tracked with a high accuracy.

Third Embodiment

Although the first calculation unit 206 outputs the positional deviation map at S604 of FIG. 6A in the first embodiment, the first calculation unit 206 according to a third embodiment outputs the positional deviation map after S605. The third embodiment will be described, focusing on the difference from the first and the second embodiments.

In FIG. 6A, the first calculation unit 206 outputs the positional deviation map at S604. However, when the output of the quantized NN is processed by using an activation function (ReLU) that provides an output whose minimum value is limited, an output range (range from the maximum value to the minimum value) of the positional deviation map is limited. Since the output value of the positional deviation map does not match with the GT 406, the loss Lossl of the positional deviation map expressed by Formula 6 no longer decreases, which may hinder the learning of the NN.

Figure 9:
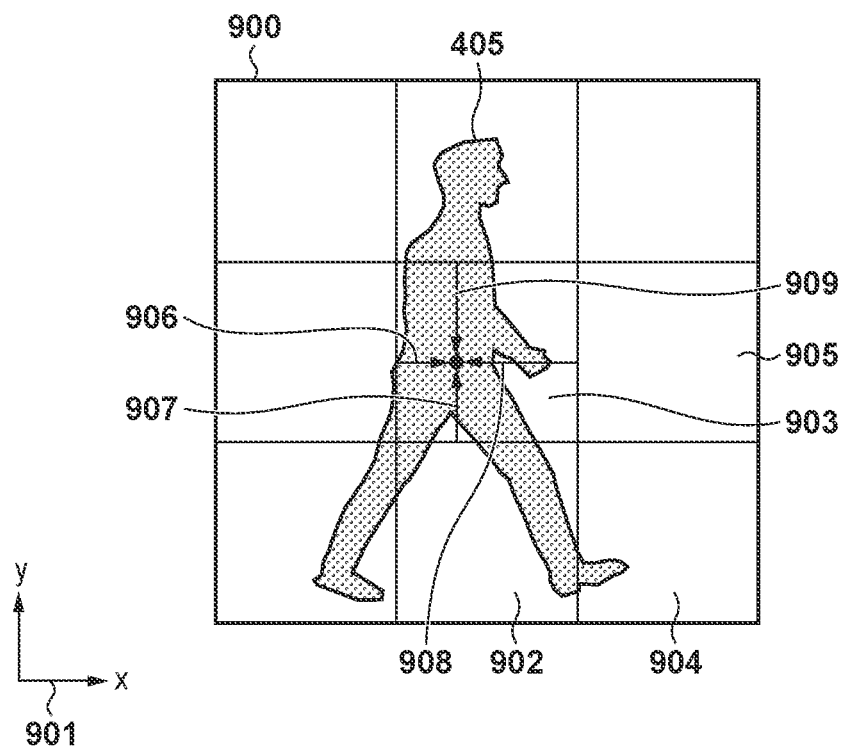
FIG. 9 is a view illustrating an example of a positional deviation map including negative values.

Here, FIG. 9 is a view illustrating an example of a positional deviation map including negative values. The positional deviation map 900 has a value in each box (pixel) of a lattice-like grid. The pixel value is a distance defined in the x- and the y-directions from the upper left reference position of each box (pixel) to the position of the center of the tracking target 405 (illustrated by a black dot). Positive and negative of the distance is defined according to an x-y coordinate system 901. In a pixel 902, for example, a positional deviation 906 in the x direction is expressed by a positive value, and a positional deviation 907 in the y-direction is expressed by a positive value. In a pixel 903, a positional deviation 906 in the x direction is expressed by a positive value, and a positional deviation 909 in the y-direction is expressed by a negative value. In a pixel 904, a positional deviation 908 in the x-direction is expressed by a negative value, and a positional deviation 907 in the y-direction is expressed by a positive value. In a pixel 905, a positional deviation 908 in the x-direction is expressed by a negative value, and a positional deviation 909 in the y-direction is expressed by a negative value.

When, on the other hand, the activation function is a ReLU (see Formula 1), for example, the minimum value of the output is 0. When, therefore, the minimum value of the output of the GT of the positional deviation map 900 includes a negative value, the learning of the NN no longer proceeds. Therefore, it is necessary to perform a shifting process on the output before outputting the positional deviation map to make the learning of the NN proceeds in a case where the estimation result (positional shift map 900) includes a negative case.

FIG. 6B is a flowchart explaining details of the processing at step S309 of FIG. 3. Although the first calculation unit 206 outputs the positional deviation map at S604 of FIG. 6A, the first calculation unit 206 outputs, in FIG. 6B, the positional deviation map at S610 after S605 (shifting process). Accordingly, the minimum value of the output of the positional deviation map matches with the minimum value of the GT even when the minimum value of the output of the positional deviation map includes a negative value, thereby the learning of the NN proceeds. As such, when it is desired to cause the output (the maximum value, the minimum value) of any one of a plurality of maps to match with the GT, it suffices to change the timing of outputting the map to after the shifting process. The plurality of maps include the likelihood map, the positional deviation map, and the size map. Here, the shift value may be common when the shifting process of S605 is performed on the output before the plurality of maps (e.g., likelihood map and positional deviation map) are acquired.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-012026, Jan. 28, 2022, which is hereby incorporated by reference herein in its entirety.

What is claimed is:

1. An information processing apparatus comprising:
  a shifting unit configured to shift an output of an activation function corresponding to an input, based on an output range of the activation function;
  a scaling unit configured to scale the output of the activation function, the output of the activation function having been shifted by the shifting unit; and
  an output unit configured to output an output value corresponding to the output of the activation function, the output of the activation function having been scaled by the scaling unit,
  wherein:
  the activation function is a function in which the minimum value of the output of the activation function corresponding to the input is equal to or larger than a predetermined value,
  the output unit outputs a map, based on either the shifted output of the activation function or the scaled output of the activation function, and
  the information processing apparatus further comprises an updating unit configured to update a parameter of a learning model that infers from the output value, based on a difference between the map output by the output unit and correct answer data.

2. The information processing apparatus according to claim 1, wherein the shifting unit shifts the output of the activation function based on a shift value obtained from a difference between the maximum value and the minimum value in the output range of the activation function.

3. The information processing apparatus according to claim 1, wherein the scaling unit determines whether or not to scale, by using a scale value, the shifted output of the activation function, based on whether or not the shifted output of the activation function has exceeded a threshold value.

4. The information processing apparatus according to claim 1, further comprising a control unit configured to store, in a memory, the parameter of the learning model, the parameter being updated by the updating unit.

5. The information processing apparatus according to claim 1, wherein the map includes:
   a likelihood map representing an estimation result indicating a position where a subject exists in a search image with a high probability,
   a size map representing an estimation result of a width and a height of the subject, and
   a positional deviation map representing an estimation result of a positional deviation of the subject in a region including a first pixel in the likelihood map and pixels in the vicinity of the first pixel.

6. The information processing apparatus according to claim 1, wherein the updating unit determines, based on the difference, a scale value used for scaling the output of the activation function by the scaling unit.

7. The information processing apparatus according to claim 1, wherein the updating unit determines a scale value based on comparison between the shifted output range of the activation function and a threshold value.

8. The information processing apparatus according to claim 1, further comprising a calculation unit configured to calculate a loss based on a likelihood map representing an estimation result indicating a position where a subject exists in a search image with a high probability, and the correct answer data, wherein
   the updating unit determines a scale value based on the loss and the correct answer data.

9. A method comprising:
   shifting an output of an activation function corresponding to an input, based on an output range of the activation function;
   scaling the output of the activation function, the output of the activation function having been shifted; and
   outputting an output value corresponding to the output of the activation function, the output of the activation function having been scaled,
   wherein:
   the activation function is a function in which the minimum value of the output of the activation function corresponding to the input is equal to or larger than a predetermined value,
   a map is output in the outputting, based on either the shifted output of the activation function or the scaled output of the activation function, and
   the method further comprises updating a parameter of a learning model that infers from the output value, based on a difference between the map output in the outputting and correct answer data.

10. A non-transitory computer-readable storage medium storing a program that, when executed by a computer, causes the computer to perform a method comprising:
    shifting an output of an activation function corresponding to an input, based on an output range of the activation function;
    scaling the output of the activation function, the output of the activation function having been shifted; and
    outputting an output value corresponding to the output of the activation function, the output of the activation function having been scaled,
    wherein:
    the activation function is a function in which the minimum value of the output of the activation function corresponding to the input is equal to or larger than a predetermined value,
    a map is output in the outputting, based on either the shifted output of the activation function or the scaled output of the activation function, and
    the method further comprises updating a parameter of a learning model that infers from the output value, based on a difference between the map output in the outputting and correct answer data.

11. An image capturing apparatus comprising:
    an image capturing unit configured to capture an image of a subject; and
    an information processing apparatus comprising:
      a shifting unit configured to shift an output of an activation function corresponding to an input, based on an output range of the activation function;
      a scaling unit configured to scale the output of the activation function, the output of the activation function having been shifted by the shifting unit; and
      an output unit configured to output an output value corresponding to the output of the activation function, the output of the activation function having been scaled by the scaling unit,
    wherein:
    the activation function is a function in which the minimum value of the output of the activation function corresponding to the input is equal to or larger than a predetermined value,
    the output unit outputs a map, based on either the shifted output of the activation function or the scaled output of the activation function, and
    the information processing apparatus further comprises an updating unit configured to update a parameter of a learning model that infers from the output value, based on a difference between the map output by the output unit and correct answer data.

12. The image capturing apparatus according to claim 11, further comprising an acceptance unit configured to accept specification of the subject to be detected from an image.

* * * * *